(No Model.) 2 Sheets—Sheet 1.

J. E. BRIGGS.
DEVICE FOR OPERATING HATCHWAY COVERS, &c.

No. 410,727. Patented Sept. 10, 1889.

Witnesses
John Becker
Charles E. Johnson.

Inventor
James E. Briggs
By James Law
Attorneys

N. PETERS, Photo-Lithographer, Washington, D. C.

(No Model.) 2 Sheets—Sheet 2.

J. E. BRIGGS.
DEVICE FOR OPERATING HATCHWAY COVERS, &c.

No. 410,727. Patented Sept. 10, 1889.

Witnesses
John Becker
Charles E. Johnson

Inventor
James E. Briggs
By James Law
Attorney

N. PETERS, Photo-Lithographer, Washington, D. C.

UNITED STATES PATENT OFFICE.

JAMES E. BRIGGS, OF BROOKLYN, NEW YORK, ASSIGNOR OF ONE-HALF TO JAMES H. SHERWOOD, OF SAME PLACE.

DEVICE FOR OPERATING HATCHWAY-COVERS, &c.

SPECIFICATION forming part of Letters Patent No. 410,727, dated September 10, 1889.

Application filed April 20, 1889. Serial No. 307,960. (No model.)

*To all whom it may concern:*

Be it known that I, JAMES E. BRIGGS, a citizen of the United States, and a resident of Brooklyn, in the county of Kings and State of New York, have invented certain new and useful Improvements in Fire-Shutters for Well-Holes and Shafts, of which the following is a specification.

My improvement relates to shutters or doors for closing well-holes, elevator-shafts, light-shafts, and similar open passage-ways in buildings for protection against the spread of fire or whenever it is wished to close the same; and it consists in a novel construction and arrangement of the shutter by which the shutter automatically closes when there is a fire in or around the building anywhere near the well-hole or shaft, and by which it may be independently opened or closed whenever desired; and, furthermore, it consists in an improved form of thermostatic device which will act quickly as soon as the heat from the fire touches it and when the fire is in any part of the room or building.

Figure 1:
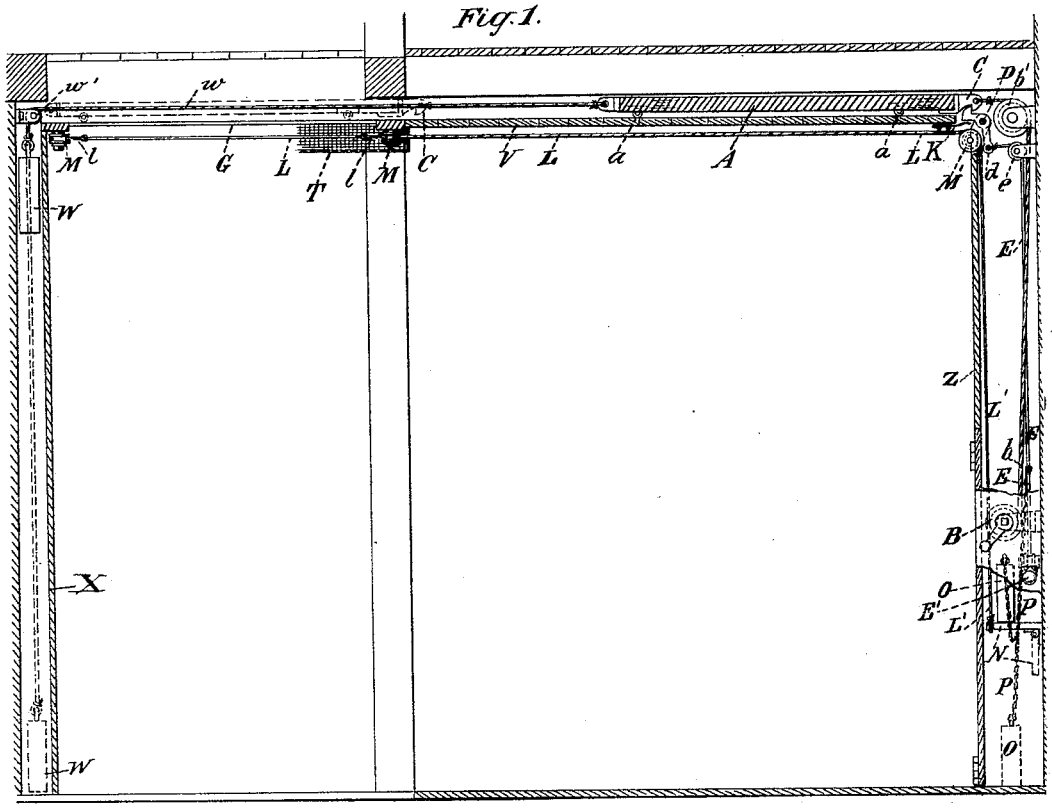
Figure 2:
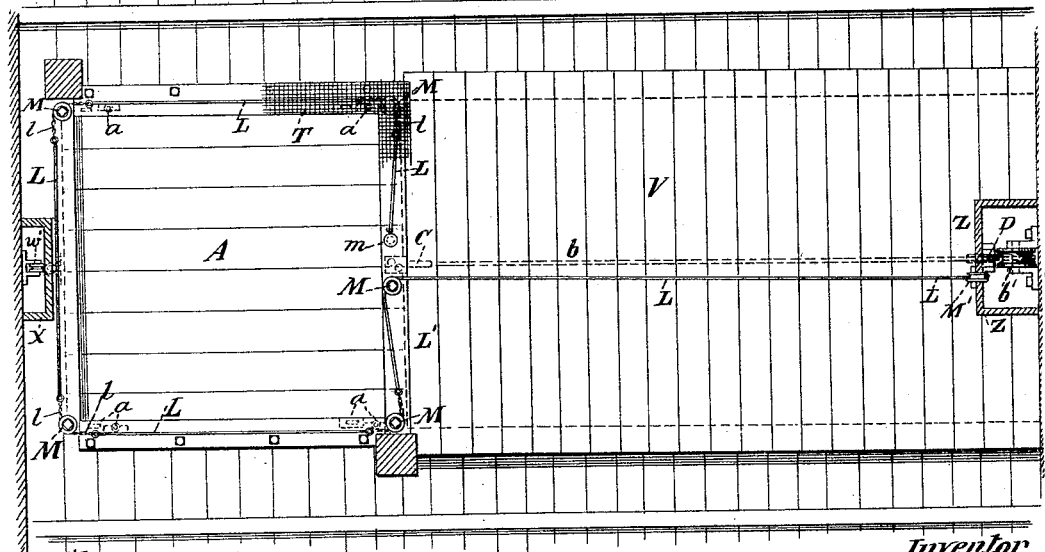
Figure 3:
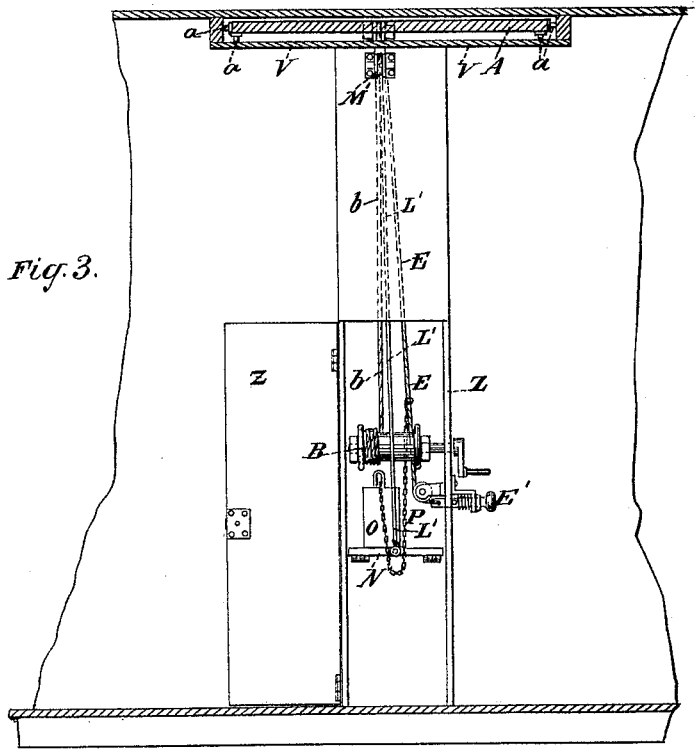
Figure 4:
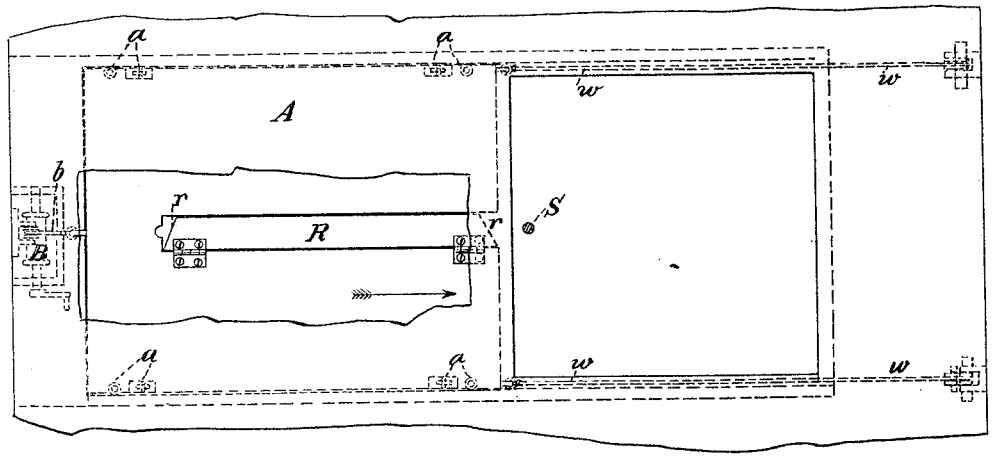
Figure 5:
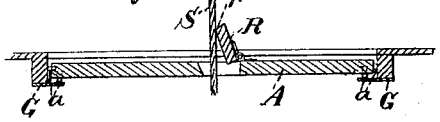

In the drawings illustrating my improvement, in which like letters indicate like parts, Figure 1 is a sectional elevation of the room, showing the well-hole or shaft and the shutter and the mechanism for opening and closing the same, the position of the shutter and controlling mechanism being shown by full lines when the shutter is open and by dotted lines when the shutter is closed. Fig. 2 is a view of the top of the room looking from below, showing the shutter closed over the well-hole and by dotted lines when open or drawn back. Fig. 3 is a view of the side of the room looking from the well-hole, showing the end of the shutter in section and the mechanism for opening the latter and for releasing the catch to close the shutter. Fig. 4 illustrates a modification of my improvement when applied to an elevator-shaft. Fig. 5 is a view of a portion of the shutter shown in Fig. 4.

In the construction shown in the drawings my improvement consists of a horizontal solid shutter A, of wood, iron, or other suitable material, arranged to slide or roll across the well-hole, so as to effectually close the same, and be drawn back, when opened, immediately under and next to the ceiling of the room or other apartment through which the well-hole or shaft passes. The shutter rests and moves on tracks or guideways G, attached to the ceiling of the room and across the sides of the well-hole or shaft, and the edges and sides of the shutter are provided with rollers $a$ to facilitate the movement of the shutter on the guideways in opening or closing.

As will be fully understood from Fig. 1, the shutter A is drawn across the well-hole or closed by the weight W, which is attached to one end or side of the shutter by the chain or rope $w$. This chain or rope $w$ passes over a wheel or pulley $w'$ at the side of the well-hole, or near the side wall of the room when the well-hole is situated some distance from the latter, so that the weight moves up and down next to the wall or side of the room. This weight is heavy enough to rapidly draw the shutter across the well-hole and effectually hold the same closed or shut. The shutter is opened or drawn back from the well-hole by a rope or chain $b$, attached to the end or side of the shutter opposite to that to which the chain $w$ is connected. This rope $b$ extends under the ceiling and passes over a pulley $b'$ and down the side of the room toward which the shutter moves in opening, and is wound on a windlass B, as is shown in Figs. 1, 2, and 3. The windlass B is secured to the wall of the room in any convenient position, and is turned by a crank or other suitable device. As will be evident, when the windlass is turned in one direction the rope or chain $b$ draws the shutter back from the well-hole, raising the weight W, and thus opening the shutter.

On the same side of the shutter to which the chain or rope $b$ is attached is a catch C, Fig. 1, which is arranged to engage with a spring-latch D, by which the shutter is held and secured back or open. This latch D may be situated on the side of the room, as shown in Figs. 1 and 3; or, if it is not intended to draw the shutter back so far, the latch D may be placed at any point on the ceiling of the room where it is desired, so as to engage with the catch C. The shutter is drawn back or away from the well-hole by the windlass B and rope $b$ until the spring-latch D engages with the catch C, when the shutter is securely held open, as will be seen from the full lines in Fig. 1.

To disengage the latch, when it is desired to release the shutter in order to close the latter, a small chain or rope E, Figs. 1 and 3, is connected to the arm $d$ of the latch. This chain E passes over a pulley $e$ and hangs down alongside of the wall or side of the room, where it can be conveniently reached and pulled. As shown particularly in Fig. 3, I prefer to attach the lower end of the chain E to a bell-pull E' or similar device, by which the chain may be easily and readily drawn down.

As will be understood from the drawings, when the handle of the bell-pull is drawn out the chain B is pulled down, thus drawing back the arm $d$ of the latch D and releasing the latch from engagement with the catch C on the shutter, when the weight W draws the shutter across the well-hole and closes the latter, the rope $b$ unwinding from the windlass B as it is pulled along by the shutter.

The mode of opening and closing the shutter, therefore, is as follows: The shutter is drawn across the well-hole or closed automatically by the weight W and chain or rope $w$ whenever the shutter is released from the spring-latch, and is held shut or in a closed position by the weight, so it cannot slide back or open by any accident. To open the shutter, the windlass B is turned by the crank, when the shutter is drawn back or from the well-hole until it is caught by the spring-latch, by which it is held open. To close the shutter at night, or at any time when it may be desired, the bell-pull E' is drawn out, when the latch at once releases the shutter, and the latter is drawn across the well-hole by the weight W. To close the shutter automatically in case of fire, I employ a fusible wire, which is placed along the ceiling of the room and around the well-hole or shaft, as shown at L, Figs. 1 and 2. This fusible wire, as will be seen from Fig. 2, is attached at one point, as at $m$, and passes over small rollers M, attached to the ceiling of the room, so as to extend around the well-hole and across the ceiling to the wall or side of the room toward which the shutter moves in opening, where it is attached to another wire or light chain L', which passes over a pulley M' and extends down the side of the room, and is connected at its lower end to the outer side of a swinging shelf N, which shelf is hinged to the side of the room so as to turn down, as will be understood from Figs. 1 and 3. One end of the fusible wire therefore is fastened to the pin $m$, and the other end is connected by means of the chain L' to the edge of the shelf N, and the length of the wire L and chain L' is such that the shelf is held out horizontally, as is shown in full lines in the drawings. On this shelf is placed a movable weight O, which is attached to one end of a cord P, the other end of which is connected to the chain E a little above the bell-pull E'. The length of the cord P should be such that when the weight hangs down the cord will pull the chain E down, and thus draw back the arm $d$ and disengage the latch. The weight O is so placed on the shelf N that most of its weight or downward pressure is taken up by the hinges by which the shelf is attached to the wall of the room, and hence the strain or tension on the fusible wire L is rendered very slight. As long as the fusible wire remains intact the shelf N is held horizontally and the weight O supported by the same, and the cord P is loose and exerts no action on the latch D. When the fusible wire around the well-hole or across the ceiling is melted and thus severed by the heat of the fire, the shelf N, no longer held up by the tension of the wire, drops down against the side of the room, as shown in dotted lines in Fig. 1, the weight O falls off, and, pulling on the cord P and chain E, releases the spring-latch D from engagement with the catch C and allows the weight W to draw the shutter across the well-hole and thus close the same. The action of the fire on the fusible wire at the top of the room thus at once releases the shutter and allows the same to be closed, and, on account of the nice adjustment of the various parts of the mechanism and the force of the weight W, the moment the fusible wire is severed the shutter is drawn across the well-hole and the latter effectually closed. The shutter thus automatically closes at once as soon as a fire starts near the well-hole or shaft. To enable the wire to act quickly when severed at any point and release the shelf, I insert a small chain $l$, of any suitable metal, as brass, in the length of wire where it passes over the pulleys or wheels M. This chain at the same time prevents the breaking of the fragile fusible wire where it bends to pass over the pulleys. As will thus be seen, in my improvement the shutter may be readily opened, no matter how great its weight or size, and can be quickly and easily closed at any time and as often as necessary, and will close itself as soon as a fire starts near the well-hole; and the automatic closing device is in no way affected or disarranged by opening or closing the shutter by the mechanical means, but remains set or adjusted at all times, and yet if it in any way becomes unadjusted or disarranged that fact is at once apparent. This improved means of opening and closing the shutter, both automatically and mechanically, may be applied to all varieties of shutters, whether rolling, folding, or swinging, and I do not confine myself to the use of such opening and closing mechanism with a sliding horizontal shutter.

In Figs. 4 and 5 is shown a modified construction of my sliding shutter to adapt the same to use in an elevator-shaft where it is necessary to provide for the elevator-rope in the shaft. As shown in the drawings, extending part way or entirely across the shutter, is a narrow hinged trap R, hinged at one side to the shutter, so as to turn up. The ends r of this trap R are beveled in such a manner that when the end strikes the elevator-rope S, as the shutter crosses the shaft, the trap is turned up, as shown in Fig. 5, and slides along the rope until the shutter has crossed the shaft, when it drops down into place, thus making the shutter solid. The trap R is beveled at both ends, so that it is raised when the shutter crosses the shaft in opening or closing. The construction of the hinged trap R must be varied to accommodate the number and position of the elevator-ropes. In this construction of the shutter for use with elevator-shafts two ropes w and weights W, as shown in Fig. 4, are necessary, in order not to interfere with the elevator-ropes in the shaft. To protect the fusible wire from injuries, I place over the wire, when it is arranged around the well-hole and across the ceiling, a cover of wire-netting, as shown at T, Figs. 1 and 2. This netting effectually protects the wire, and at the same time the mesh of the netting is so large as not to interfere with the action of the heat from the fire on the wire and does not interfere with the free movement of the wire around the rollers M. As shown in the drawings, the shutter when drawn back under the ceiling is protected from view by a casing V, which extends under the shutter. Of course the fusible wire L passes outside or under the casing. The weight W and rope w, as it extends down the side of the room, and the windlass B, shelf N, and weight O, and the various chains and cords attached to the same are likewise inclosed in casings, as shown at X and Z in Figs. 1, 2, and 3. My improved shutter thus constructed and operated effectually closes the well-hole or shaft across which it is drawn, preventing, in case of a fire, a draft up through the well-hole and confining the fire to the compartment below it, and at the same time, when closed, prevents all passage from one floor or compartment to another through the well-hole or shaft.

In using my shutter I design to have a shutter at each floor or at the top of each compartment, and also at the top of the well-hole or shaft or under the skylight, in order to completely and effectually close the well-hole or shaft.

The automatic thermostatic closing device described above may be employed with sliding or swinging doors and shutters, and with drop-curtains or screens such as are used in theaters, and whenever it is desired to close an opening to prevent the spread of fire.

Heretofore in the case of self-closing shutters or doors which have been arranged to be released and closed by the action of heat from a fire the automatic or thermostatic device by which the door is released has consisted of a fusible link or joint arranged in one place near the shutter, and in the constructions heretofore used the direct weight of the shutter or force of the closing mechanism has come upon or been sustained by this fusible link. The link, therefore, has had to possess great strength, and hence has been made large and heavy. It is obvious that unless the heat from the fire acts directly at the particular place where the fusible link is situated and is of sufficient intensity to melt and thus sever the thick heavy piece of fusible metal the automatic device will not operate. A strong draft may draw the heat of the fire away from the fusible link, and thus the fire gain considerable headway before the link is severed, thus making the fusible link practically valueless. In my improvement I employ, instead of a fusible link, a small fine wire of fusible metal, which is stretched entirely around the well-hole or shaft and across the ceiling of the room, and may extend anywhere that is desired. Such wire forms a continuous fusible connection which reaches every part of the room and presents a great surface to the action of the fire, and thus is at once severed as soon as a fire starts, it being impossible for the fire to reach the opening in the ceiling before the shutter is closed. The use of such wire has not been possible with self-closing doors as heretofore constructed and arranged on account of the nature of the wire itself, as the fusible wire is very fragile and is easily broken when subjected to any great strain, and hence cannot sustain directly the weight of the door or the force of the closing mechanism. With my improved automatic closing device I overcome this difficulty. The drop door or shelf to which the fusible wire is attached, and which holds the weight which releases the spring-latch, is hinged at one end to the side of the room, so as to swing down, and the wire thus simply holds up the free end of the shelf or holds the shelf in a horizontal position. The weight which falls and releases the spring-latch is placed on that end of the shelf which is hinged to the side of the room and near the hinges themselves. Most of its weight or downward pressure, therefore, is taken by the hinges, and very little comes on the fusible wire, and the length of the shelf and arrangement of the weight on the same are such that the strain or pull on the fusible wire is very slight. Hence with my improvement I am enabled to use a fine fusible wire, which is easily severed, and at the same time control the closing of a heavy shutter or door.

I do not claim the use of a fusible link directly sustaining the shutter or closing mechanism; but

What I claim as new is—

1. The combination, with a shutter arranged and adapted to be closed or drawn across the well-hole and to be held back or open by a spring-latch, of the automatic thermostatic closing device consisting of the fusible wire L, secured at one end and passing around the well-hole and room and connected by the other to the swinging shelf N, the shelf N, hinged to the wall and held up directly by the fusible wire L, and the weight O, supported by the shelf and connected to and adapted to release the spring-latch, the whole arranged and operating as described, as and for the purposes set forth.

2. The combination, with a shutter arranged to be closed or drawn across the well-hole, of the direct releasing device, consisting of the spring-latch D and cord E, and the automatic thermostatic releasing device, consisting of the fusible wire L, secured at one end and connected by the other to the swinging shelf N, the shelf N, hinged to the side of the room, and the weight O, adapted to open the spring-latch D, the whole arranged and operating as directed, as and for the purposes set forth.

3. The combination, with the shutter A, arranged to be drawn across the well-hole by the weight W and rope $w$ and to be drawn back from the well-hole or shaft by the windlass B and rope $b$, of the spring-latch D, adapted to engage and hold the shutter and be released by the cord E, and the automatic thermostatic device consisting of the fusible wire L, shelf N, weight O, and cords P and E, substantially as described, and for the purpose set forth.

4. The thermostatic device for releasing shutters and doors, consisting of the fusible wire L and chains $l$, fastened at one end and passing around the room and connected to the shelf N, the shelf N, held up directly by the fusible wire L, and the weight O, arranged to release the shutter, the whole arranged and operating as described, substantially as and for the purpose set forth.

Signed at New York, in the county of New York and State of New York, this 18th day of April, A. D. 1889.

JAMES E. BRIGGS.

Witnesses:
CHARLES E. JOHNSON,
WM. P. MULVY.